Figure 1:
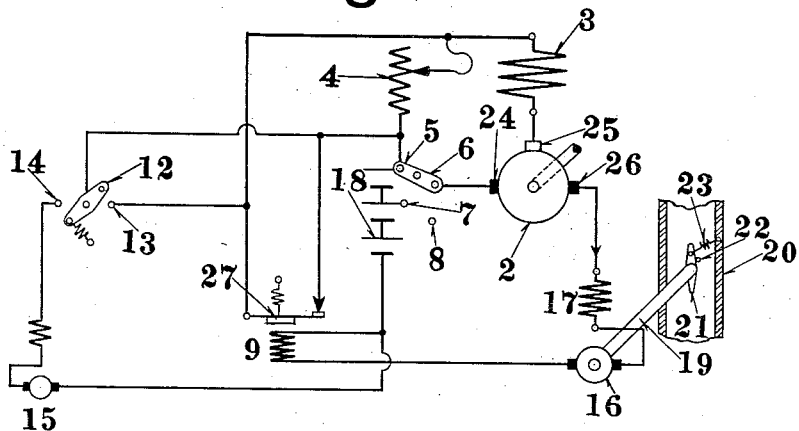

V. A. FYNN.
SPEED REGULATING APPARATUS.
APPLICATION FILED JULY 5, 1919.

1,397,278.

Patented Nov. 15, 1921.

INVENTOR
V. A. Fynn
BY E. E. Huffman
ATTORNEY

UNITED STATES PATENT OFFICE.

VALÈRE A. FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

SPEED-REGULATING APPARATUS.

1,397,278.  Specification of Letters Patent.  Patented Nov. 15, 1921.

Application filed July 5, 1919. Serial No. 308,866.

*To all whom it may concern:*

Be it known that I, VALÈRE A. FYNN, a subject of the King of England, residing at the city of St. Louis, State of Missouri, United States of America, have invented a certain new and useful Speed-Regulating Apparatus, of which the following is such a full, clear, and exact description as will enable any one skilled in the art to which it appertains to make and use the same, reference being had to the accompanying drawings, forming part of this specification.

This invention relates to means for electro-magnetically governing the speed of prime movers. It has particular reference to the regulation of the speed of internal combustion engines and to systems in which the regulation is dependent on two opposed E. M. F.'s, one of which is dependent on the speed of the prime mover.

In systems of the type referred to, the regulation is accomplished by the current flowing from one source of E. M. F. to the other and the closeness of regulation depends on the rate of change of this current, or on the steepness of the curve representing same. In one system of this kind, the E. M. F. of a shunt generator driven by the prime mover is opposed to the E. M. F. of an independent source, such as a storage battery. Both members of the generator are made movable, one of them is connected to the prime mover and the other to the throttle valve of same. In another form of this type of system, one member of a shunt generator is stationary, the other is driven by the prime mover and a controller in the form of a motor or solenoid or the like in control of the throttle valve is interposed between the generator and the independent source of E. M. F. In both of these cases, the speed of the prime mover is preferably adjusted by varying the resistance of the exciting circuit of the generator, and it is observed that the greater the resistance in the exciting circuit, the flatter the current curve and the poorer the regulation. Not only does the current curve flatten out, but the maximum current which can be sent from one source into another diminishes rapidly with increasing resistance of the exciting circuit of the engine driven generator and restricts the range of available speeds. One object of this invention is to so change the system as to secure steep current curves over a much wider range of speeds. I achieve this by connecting the exciting winding to points on the commutator between which the E. M. F. increases with increasing current output and speed. To this end, I make use of one of the main brushes located in the neutral zone and of an auxiliary brush located between the two main brushes. A generator of this description may be connected to a storage battery when standing still or revolving at a very low speed and if the resistance of its exciting circuit is sufficiently low, it will generate a voltage opposed to that of the storage battery and eventually send a charging current into the latter, but if the resistance in the generator exciting circuit is considerably increased, then it sometimes happens that the generator generates a voltage in the same direction as that of the battery to which it is connected, in which case the combination amounts to a short circuit and is inoperative for the purposes here desired.

Another object of this invention is to prevent this reversal from occurring at the time when the prime mover is started. This is achieved by providing means for short-circuiting the regulating resistance in circuit with the exciting winding of the generator at the time of starting the prime mover. The preferred way of carrying this into practice is to interlock these shortcircuiting means with the starting means.

The reversal of generator E. M. F. referred to also sometimes occurs in normal operation when the generator is driven by the prime mover and connected to the battery and resistance is inserted in the exciting circuit of the generator. The picking-up speed of the generator and the speed to which it will hold the prime mover both depend on the amount of resistance in the exciting circuit of the generator. Now, it often happens that during the operation of such a speed regulating system, the engine speed falls below the picking-up speed corresponding to the resistance then in circuit with the exciting circuit of the generator. In such cases, said generator "reverses."

In order to obviate this disadvantage and to make this arrangement available for a wide range of speeds, I provide means whereby the resistance of the exciting circuit of the generator is reduced as soon as the current output of same reaches a predetermined low limit.

A further object of this invention is to further increase the range of regulation by providing means for varying the magnitude of the E. M. F. which is independent of the speed of the prime mover and combining therewith means whereby the E. M. F. in the exciting circuit of the engine driven generator is increased whenever the E. M. F. independent of the generator is decreased. This object may also be partially achieved by leaving the independent E. M. F. unchanged and providing means for increasing the excitation or the exciting voltage of the engine driven generator at the lowest speed.

Other objects and advantages of this invention will appear from the following more detailed description.

Figure 2:
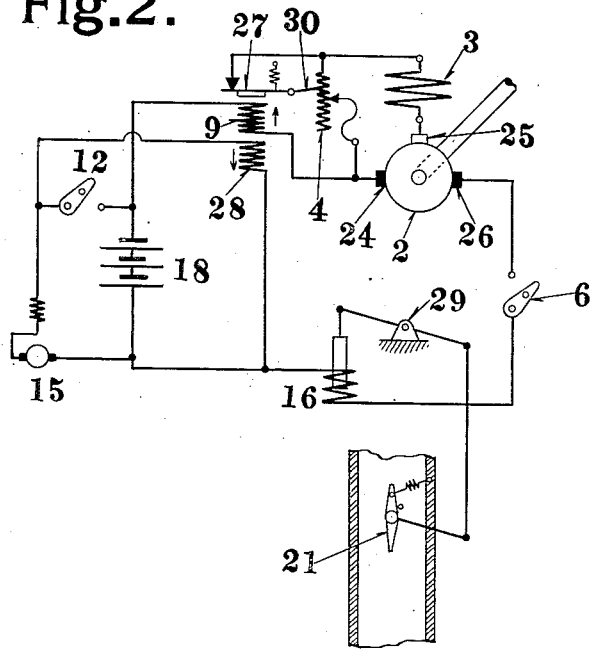

In the accompanying drawings, Figure 1 illustrates the novel features herein above referred to applied to a system in which a controller or the like is connected between the generator and storage battery and placed in control of the throttle valve. Fig. 2 illustrates a modification in which the relay controlling the resistance of the exciting circuit is provided with both a series and a shunt winding.

Referring to Fig. 1, the internal combustion engine to be regulated drives the armature 2 of the generator which is provided with a suitable commutator and the main brushes 24, 26 coöperating therewith. An auxiliary brush 25 located between the two main brushes also coöperates with the commutator. The field structure is stationary and is provided with an exciting winding 3 connected between the brushes 24, 25 with the interposition of the adjustable resistance 4. A storage battery 18 here shown as consisting of three cells is connected in series with the armature 2, the winding 9 of the relay 27 and with the series motor 16, 17 which here acts as the controller and is in control of the throttle valve 21 of the internal combustion engine. The series motor 15 is adapted to crank the internal combustion engine and may, by means of the spring controlled and normally open switch 12, be connected to the three cells of the storage battery. This same switch 12 is also adapted to shortcircuit the adjustable resistance 4 by means of the contact 13 whenever the circuit of the cranking motor is closed. The relay 27 is normally closed and shortcircuits the adjustable resistance 4, but when the current through the controller 16, 17 exceeds a certain amount, the coil 9 of the relay overpowers the spring controlled armature and interrupts this shortcircuit around the adjustable resistance 4.

The switch 6 makes it possible to connect brush 24 of the generator armature 2 to one of the contact points 5, 7 or 8. On point 8, the armature circuit of the generator and therefore the circuit of the controller is interrupted. On point 7, the armature is in circuit with two cells of the battery, the relay winding 9 and the controller, and on point 5, the armature is in circuit with three cells of the battery, the relay winding and the controller.

When the internal combustion engine is at rest, switch 6 should be on point 8 and the starting switch 12 should be open. Under these conditions, the relay 27 will be closed. When it is desired to start the engine, switch 12 should be closed and released when the engine starts. The switch 6 may now be moved to point 7 or 5; however, before the switch 6 is moved from point 8 there is nothing to prevent the engine from racing and it is therefore preferable to close the armature circuit of the generator by placing switch 6 on point 7 or on point 5 before closing the starting switch 12. With switch 6 on point 7, the E. M. F. opposing the generator E. M. F. will be a minimum and the excitation of the generator can be raised to a maximum by cutting out the resistance 4. In this connection the E. M. F. of one of the cells of the storage battery will be included in the exciting circuit in a direction to increase the current in same. The fact that the generator excitation is at a maximum while the opposing E. M. F. is a minimum, will result in the spring controlled throttle valve 21 being closed at a very low engine speed. As soon as the armature circuit of the generator has been completed by placing switch 6 on point 7 or on point 5 and with the engine at rest, the battery will discharge through the generator, the controller and the winding 9 of the relay. This discharge current, particularly with the switch 6 on point 5 may be large enough to open the relay 27. If all or the greater part of the resistance 4 is not cut out of circuit, the generator may "reverse" and it is for this reason that the starting switch 12 is provided with the additional contact 13 which short circuits the adjustable resistance 4 as soon as the circuit of the cranking motor is closed. In this way, provision is made for always starting the engine and the generator under conditions which will insure the building-up of the generator voltage in the right direction.

When the engine is operating under its own power, its speed can be changed by moving switch 6 on point 7 and with all the resistance 4 cut out. A higher speed will be reached with some of the resistance 4 included in the exciting circuit or with switch 6 on point 5 and all of the resistance 4 cut out. Still higher speeds can be secured by increasing the resistance in the exciting circuit of the generator.

Supposing that the controller 16, 17 which may be of any desired type requires four amperes to just balance the spring 23 which holds the throttle valve 21 in its open position, and ten amperes to turn this valve and hold it in its closed position, then the winding 9 of the relay can be dimensioned to open the short circuit around the resistance 4 at about three amperes and to keep it open for all higher current values. When so dimensioned, this coil 9 will allow the spring to close the relay and shortcircuit the winding 4 at some current value a little below three amperes, with the result that whenever the current in the controller circuit exceeds three amperes and varies within the operating range of said controller, the shortcircuit around the resistance 4 controlled by the relay will open and this resistance 4 will be available for speed regulation; but if this current falls below three amperes for any reason whatsoever, for instance, because of reduction of the engine speed due to overload, then the resistance 4 will be shortcircuited by the relay and the controller current will thereby be boosted until it equals or slightly exceeds three amperes, at which time the shortcircuit will again be interrupted. This play will continue until the engine speed has again reached the value determined by the resistance 4. In the absence of the relay 27 or its equivalent, a reduction in the engine speed below the figure for which resistance 4 happens to be set will result in a reduction of the controller current to zero and may lead to a permanent reversal of said current. Since the controller will operate to close the valve with a certain value of current irrespective of the direction thereof, a reduction of the engine speed to a point where the controller current reverses and reaches said value would be followed by a closing of the throttle valve at a time when it should be wide open and thus bring about a speedy shutting down of the engine. This reversal of the current in the controller circuit may furthermore lead to a reversal of the generator excitation and thus make the shutting down of the engine doubly sure. All these undesirable conditions are avoided by the use of the means described for preventing the generator current from falling below a certain value irrespective of the engine speed so long as said speed is within the range over which the regulating device is designed to operate.

In Fig. 2 the shunt winding 28 is connected to the battery 18 by means of the starting switch 12 and so proportioned as to sufficiently neutralize the magnetization of the winding 9 at the moment of starting, thus positively providing that the relay 27 will not open at this time. The winding 28 is in circuit only when the circuit of the cranking motor 15 is closed. Switch 6 is closed at starting and a discharge current passes through the winding 9. If the magnetization it produces is in the direction indicated by the arrow adjacent to the winding then the shunt winding 28 is so connected as to produce a magnetization in the opposite direction. Complete neutralization of the magnetization of the winding 9 by that of 28 is not necessary, it being sufficient that the differences between these magnetizations be too small to open the relay.

Having fully described my invention, what I claim as new and desire to secure by Letters Patent of the United States is:

1. The combination of a prime mover, speed controlling means therefor, means for actuating the speed controller, said means comprising a generator driven by the prime mover and provided with means causing its excitation to vary with the armature reaction flux and speed of the generator, and an independent source of E. M. F. in circuit with the generator and connected to oppose the generator E. M. F.

2. The combination of a prime mover, speed controlling means therefor, means for actuating the speed controller, said means comprising a generator driven by the prime mover, an independent source of E. M. F. in circuit with the generator, and means for automatically increasing the generator excitation when the current delivered by the generator falls below a predetermined value.

3. The combination of a prime mover, a speed controller therefor, electro-magnetic means for actuating the controller, a generator driven by the engine and in circuit with said electro-magnetic means, and means for automatically increasing the generator excitation when the current delivered by the generator falls below a predetermined value.

4. The combination of a prime mover, a speed controller therefor, electro-magnetic means for actuating the controller, a generator driven by the engine and in circuit with said electro-magnetic means, an independent source of E. M. F. in circuit with the generator, and means for automatically increasing the generator excitation when the current delivered by the generator falls below a predetermined value.

5. The combination of a prime mover, a speed controller therefor, electro-magnetic means for actuating the controller, a generator driven by the engine and in circuit with said electro-magnetic means, a resistance in series with the exciting winding of the generator and means governed by the current delivered by the generator for shortcircuiting said resistance.

6. The combination of a prime mover, a speed controller therefor, means for actuating the controller, said means comprising a generator driven by the prime mover, a battery in circuit with the generator and connected to oppose the generator E. M. F., and means for applying at least a portion of the battery E. M. F. to the exciting circuit of the generator.

7. The combination of a prime mover, a speed controller therefor, means for actuating the controller, said means comprising a generator driven by the prime mover, a battery in circuit with the generator and connected to oppose the generator E. M. F., and means for applying at least a portion of the battery E. M. F. to the exciting circuit of the generator and removing a part of said battery E. M. F. from the armature circuit of the generator.

8. The combination with an internal combustion engine, of a starting motor therefor, a speed controller for the engine, means for actuating said controller, said means comprising a generator driven by the prime mover and having a resistance in its exciting circuit, a motor starting switch and means whereby said switch in its closed position renders the resistance in the exciting circuit of the generator ineffective.

9. The combination with an internal combustion engine, of a starting motor therefor, a speed controller for the engine, means for actuating said controller, said means comprising a generator driven by the prime mover and having a resistance in its exciting circuit, a motor starting switch and means whereby said switch in its closed position short circuits the resistance in the exciting circuit of the generator.

10. The combination of an internal combustion engine, a speed controlling fuel supply valve therefor, a motor for starting the engine, means for actuating the fuel supply valve, said means comprising a generator driven by the engine, an independent source of E. M. F. in circuit with said generator, a motor controlling switch and means controlled by said switch for preventing reversal of the direction of generator voltage while the motor is operating to start the engine.

11. The combination with a prime mover of a dynamo electric machine for regulating the speed thereof, said dynamo electric machine being provided with an exciting circuit, and means for increasing the current in the exciting circuit when the current in the armature circuit falls below a predetermined value.

12. The combination of a prime mover, a speed controller therefor, means for actuating the controller comprising a generator driven by the prime mover, a resistance normally in the exciting circuit of the generator, and means for shortcircuiting said resistance when the current output of the generator falls below a predetermined value.

13. The combination of a prime mover, a speed controller therefor, means for actuating the controller comprising a generator driven by the prime mover, a resistance normally in the exciting circuit of the generator, means for shortcircuiting said resistance when the current output of the generator falls below a predetermined value, and means for varying said resistance.

14. The combination of a prime mover, a speed controller therefor, means for actuating the controller, said means comprising a generator driven by the prime mover, a battery in circuit with the generator and connected to oppose the generator E. M. F., means for applying at least a portion of the battery E. M. F. to the exciting circuit of the generator and removing a part of said battery E. M. F. from the armature circuit of the generator, and means for varying the resistance in the exciting circuit.

In testimony whereof, I have hereunto set my hand and affixed my seal.

VALÈRE A. FYNN. [L. S.]